(12) United States Patent
Wahl et al.

(10) Patent No.: US 12,162,421 B2
(45) Date of Patent: Dec. 10, 2024

(54) SIDE AIRBAG MODULE, VEHICLE SEAT, AND VEHICLE

(71) Applicants: ZF AUTOMOTIVE GERMANY GMBH, Alfdorf (DE); Audi AG, Ingolstadt (DE)

(72) Inventors: Marco Wahl, Sulzbach-Laufen (DE); Gerd Zischka, Schwäbisch Gmünd (DE); Karel Jiricka, Ingolstadt (DE); Christian Weiss, Böhmfeld (DE)

(73) Assignees: ZF AUTOMOTIVE GERMANY GMBH, Alfdorf (DE); AUDI AG, Ingolstadt (DE)

( * ) Notice: Subject to any disclaimer, the term of this patent is extended or adjusted under 35 U.S.C. 154(b) by 0 days.

(21) Appl. No.: 17/441,305

(22) PCT Filed: Mar. 19, 2020

(86) PCT No.: PCT/EP2020/057600
§ 371 (c)(1),
(2) Date: Sep. 21, 2021

(87) PCT Pub. No.: WO2020/193360
PCT Pub. Date: Oct. 1, 2020

(65) Prior Publication Data
US 2022/0161753 A1 May 26, 2022

(30) Foreign Application Priority Data
Mar. 22, 2019 (DE) ..................... 10 2019 107 364.2

(51) Int. Cl.
*B60R 21/231* (2011.01)
*B60R 21/207* (2006.01)
*B60R 21/233* (2006.01)

(52) U.S. Cl.
CPC ...... *B60R 21/23138* (2013.01); *B60R 21/233* (2013.01); *B60R 21/207* (2013.01);
(Continued)

(58) Field of Classification Search
CPC ............ B60R 21/23138; B60R 21/233; B60R 2021/23146; B60R 2021/23324; B60R 21/207
See application file for complete search history.

(56) References Cited

U.S. PATENT DOCUMENTS

2006/0022439 A1 2/2006 Bayley et al.
2006/0103119 A1 5/2006 Kurimoto et al.
(Continued)

FOREIGN PATENT DOCUMENTS

DE 10023774 A1 * 11/2001 ........... B60N 2/4876
DE 102006036793 A1 12/2007
(Continued)

OTHER PUBLICATIONS

Miller et al. DE 10 2007 013543A1, Occupant Restraint Device, Machine English Translation, ip.com (Year: 2008).*
(Continued)

*Primary Examiner* — Karen Beck
(74) *Attorney, Agent, or Firm* — Tarolli, Sundheim, Covell & Tummino LLP

(57) ABSTRACT

A side airbag module (24) for a restraint device has a side airbag (26), in particular a seat-integrated side airbag (26), wherein the side airbag (26) includes at least a first chamber (32) and at least a second chamber (34) provided above the first chamber (32) which are fluidically connected to each other via a fluid communication, and wherein, in a first activated state of the side airbag module (24), a first pressure (p1) prevails in the first chamber (32) and, in a second activated state, a second pressure (p2) prevails in the first
(Continued)

chamber (32) and in the second chamber (34), the first pressure (p1) being higher than the second pressure (p2).

20 Claims, 3 Drawing Sheets

(52) U.S. Cl.
CPC ............ *B60R 2021/23146* (2013.01); *B60R 2021/23324* (2013.01)

(56) References Cited

U.S. PATENT DOCUMENTS

| | | |
|---|---|---|
| 2006/0131845 A1 | 6/2006 | Belwafa et al. |
| 2009/0184500 A1* | 7/2009 | Feller ................ B60R 21/23138 280/730.2 |
| 2009/0200774 A1 | 8/2009 | Nam et al. |
| 2019/0111880 A1* | 4/2019 | Choi .................... B60R 21/013 |
| 2020/0180540 A1* | 6/2020 | Fuma ...................... B60R 21/26 |
| 2021/0370861 A1* | 12/2021 | Matsushita ........... B60R 21/239 |

FOREIGN PATENT DOCUMENTS

| | | | |
|---|---|---|---|
| DE | 102006032805 A1 | 1/2008 | |
| DE | 102007013543 A1 * | 9/2008 | ......... B60R 21/0134 |
| DE | 102009016800 A1 | 10/2010 | |
| DE | 102013019939 A1 | 5/2015 | |
| DE | 102017121798 A1 | 3/2019 | |
| EP | 0999101 A1 | 5/2000 | |
| WO | WO-2006063195 A2 * | 6/2006 | ........... B60N 2/0276 |

OTHER PUBLICATIONS

Langer, R. DE10023774A1 Vehicle Seat, Machine English Translation ip.com (Year: 2001).*

PCT International Search Report for corresponding International Application Serial No. PCT/EP2020/057600, dated May 25, 2020, pp. 1-6.

* cited by examiner

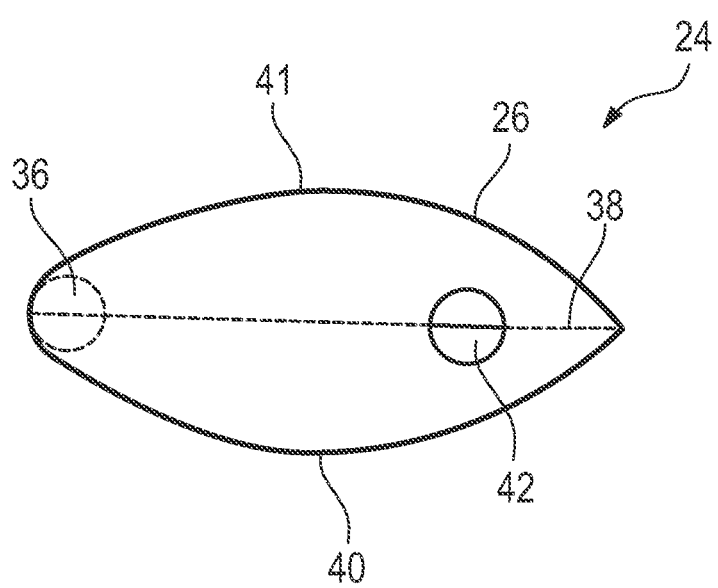

SIDE AIRBAG MODULE, VEHICLE SEAT, AND VEHICLE

RELATED APPLICATIONS

This application is a U.S. National Stage Application filed under 35 USC 371, claiming priority to Serial No. PCT/EP2020/057600, filed on 19 Mar. 2020; which claims priority from German Patent Application DE 10 2019 107 364.2, filed 22 Mar. 2019, the entireties of which are hereby incorporated herein by reference.

TECHNICAL FIELD

The invention relates to a side airbag module for a restraint device. Moreover, the invention relates to a vehicle seat comprising a side airbag module and to a vehicle.

BACKGROUND

Restraint devices including airbag modules are known and are usually employed in automotive vehicles to support a vehicle occupant in case of need.

In the future, the requirements to the flexibility of restraint devices will increase, as when autonomous and/or automated driving becomes more widespread, a seating position adopted by the vehicle occupants may vary significantly more depending on the driving situation than is currently the case.

SUMMARY

Therefore, it is an object of the present invention to provide a side airbag module for a restraint device that is adapted to especially safely support a vehicle occupant in different seating positions.

According to the invention, this object is achieved by a side airbag module for a restraint device, comprising a side airbag, in particular a seat-integrated side airbag, the side airbag having at least a first chamber and at least a second chamber provided above the first chamber which are fluidically connected to each other via a fluid communication, wherein, in a first activated state of the side airbag module, a first pressure prevails in the first chamber and, in a second activated state of the side airbag module, a second pressure prevails in the first chamber and in the second chamber, the first pressure being higher than the second pressure.

The position of the second chamber above the first chamber is related to a mounted and inflated state of the side airbag module.

Upon activation of the side airbag module, initially the first pressure in the first chamber is reached. From a sufficient pressure in the first chamber, gas flows into the second chamber, thus allowing the second pressure to adjust in the first chamber and in the second chamber. Consequently, the second activated state follows the first activated state. Hence, the first and second activated states describe successive states of the side airbag of the side airbag module which occur after activation of the side airbag module.

As, in the first activated state of the side airbag module, in the first chamber a first pressure prevails, with the first pressure being higher than the second pressure, the side airbag module can fulfill various functions and can flexibly adapt to a given seating position of a vehicle occupant.

The first chamber of the side airbag is, for example, a shoulder chamber and the second chamber of the side airbag is, for example, a head chamber. Thus, the side airbag is suited to support both a shoulder area and a head area of a vehicle occupant.

According to one embodiment, the first pressure is selected such that the first chamber constitutes a pusher and/or the second pressure is selected such that the first chamber and/or the second chamber constitute(s) a body protection, in particular a head protection. That is, the first pressure is sufficiently high to press a vehicle occupant away from a side structure of a vehicle or to keep him/her at a distance in case of need. The second pressure is selected such that it can damp a movement of a vehicle occupant toward a side structure. In this way, a vehicle occupant is particularly well protected.

The first chamber and the second chamber may be separated from each other by a partition wall disposed inside the side airbag, wherein an overflow opening constituting the fluid communication is provided in the partition wall. By means of a partition wall, two chambers can be formed in an especially simple manner. In addition, an overflow opening can be realized especially easily in the partition wall by a cutout.

As an alternative, the side airbag includes two outer walls, for example, that delimit the first chamber and the second chamber, wherein the first chamber and the second chamber are separated from each other by a seam provided in the side airbag and connecting the outer walls, in particular wherein an interruption constituting the fluid communication is provided in the seam. By means of a seam, two chambers can be formed without additional components such as an additional partition wall being required. A side airbag designed in this way can thus be manufactured at especially low cost.

The side airbag, in particular the outer walls, is preferably designed to be tight. Thus, in the case of need, a sufficient internal pressure for head restraint can be achieved. This is also applicable to pre-crash activation of the side airbag. That is, particularly 40 to 50 ms after a time t0 at which a case of need occurs a sufficient internal pressure is provided when the activation has taken place 50 ms before the time t0, for example.

According to one embodiment, the side airbag module includes a gas generator that is fluidically connected to the first chamber. Thus, gas generated by the gas generator first flows into the first chamber. Via the first chamber, the gas generator is fluidically connected especially to the second chamber. Thus, initially the first chamber is filled with gas and a first pressure adjusts in the first chamber. This enables the function of pusher of the first chamber. At the same time, gas flows into the second chamber. After some time, a second pressure adjusts in the first chamber and in the second chamber which is lower than the first pressure in the first chamber. Thus, the first chamber and/or the second chamber may serve as head protection.

According to the invention, the object is further achieved by a vehicle seat having a side airbag module that is configured as afore-described, wherein the side airbag module is arranged in the vehicle seat such that, in the first and/or second activated state, the first chamber is arranged in the shoulder area of the vehicle seat and the second chamber is arranged in the head area of the vehicle seat.

The shoulder area and the head area constitute different height areas of the seat, i.e., different areas in the direction of the vehicle axis. For normal-sized vehicle occupants, the head is usually located in the head area of the seat, the shoulders are located in the shoulder area.

The head area is arranged especially above the shoulder area. For example, the shoulder area is arranged in the area of a seatback of the vehicle seat, in particular in the area of an upper end of the seatback, and the head area is arranged in the area of a headrest.

Preferably, the second chamber extends in the first and/or second activated state over the entire height of the head area, in particular when the vehicle seat is in a normal position with an upright seatback.

Beneath the side airbag module, another side airbag module, in particular a thorax airbag module, may be arranged in the vehicle seat. Thus, a vehicle occupant is especially safely supported.

The object is further achieved, according to the invention, by a vehicle having a side airbag module configured as afore-described, and a roof rail-integrated head airbag module including a head airbag, wherein, in a side view, in the first and/or second activated state the side airbag is adjacent to and/or overlaps the head airbag.

BRIEF DESCRIPTION OF THE DRAWINGS

Further advantages and features of the invention will be obvious from the following description and from the following drawings which are referred to, and wherein:

FIG. 5 shows a section across the side airbag module from FIG. 4 along the line A-A in FIG. 4.

DESCRIPTION

Figure 1:
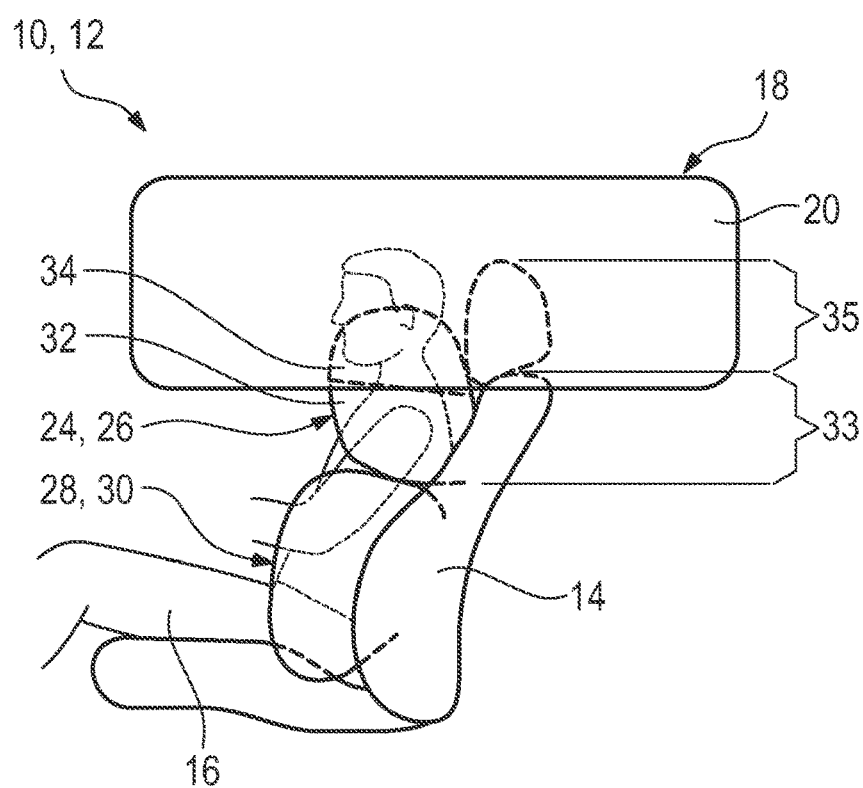
FIG. 1 schematically shows a portion of a vehicle according to the invention comprising a vehicle seat according to the invention that includes a side airbag module according to the invention, FIG. 2 schematically shows the portion according to FIG. 1, wherein the vehicle seat is in a position different from that of FIG. 1, FIG. 3 schematically shows the portion according to FIGS. 1 and 2 with a smaller vehicle occupant than in FIGS. 1 and 2, FIG. 4 schematically shows a side airbag module according to the invention.

FIG. 1 illustrates a portion of a vehicle 10, in particular of an interior 12 of the vehicle 10, in the area of a vehicle seat 14 of the vehicle 10, with the vehicle seat 14 being in an upright position.

The vehicle 10 is an automotive vehicle, for example a passenger car.

In the vehicle seat 14 a vehicle occupant 16 is seated, in particular in a normal position. Such position of the vehicle seat 14 is usually adjusted when the vehicle occupant 16 him-/herself steers the vehicle 10.

The vehicle 10 comprises a restraint device including plural airbag modules.

On the one hand, the restraint device comprises a side airbag module 24 according to the invention having a side airbag 26, particularly a seat-integrated side airbag 26. The side airbag module 24 is shown in detail in FIG. 4.

Moreover, the restraint device comprises a roof rail-integrated head airbag module 18 including a head airbag 20, the head airbag 20 in FIG. 1 being shown in an activated state. The head airbag 20 is suited to support the head of the vehicle occupant 16.

In a side view of the vehicle 10, as shown in FIG. 1, the side airbag 26 of the side airbag module 24 is adjacent to and overlaps the head airbag 20 in the activated state.

Moreover, the restraint device comprises another side airbag module 28 in the form of a thorax airbag module 30. The side airbag module 28 may also be integrated in the vehicle seat 14.

The thorax airbag module 30 is arranged in the vehicle seat 14 beneath the side airbag module 24.

The side airbag 26 includes a first chamber 32 and a second chamber 34 provided above the first chamber 32.

The side airbag module 24 is arranged in the vehicle seat 14 such that, in the activated state, the first chamber 32 is arranged in a shoulder area 33 of the vehicle seat 14 and the second chamber 34 is arranged in a head area 35 of the vehicle seat 14.

According to an alternative embodiment which, to simplify matters, is not illustrated in the Figures, the second chamber 34 may be so large that in the activated state it extends over the entire height of the head area 35.

The first chamber 32 of the side airbag 26 is in particular a shoulder chamber and the second chamber 34 of the side airbag 26 is a head chamber.

The first chamber 32 and the second chamber 34 are fluidically connected to each other via a fluid communication, wherein, in a first activated state of the side airbag module 24, a first pressure p1 prevails in the first chamber 32.

For example, in the first activated state, the second chamber 34 is not or only partially inflated, in particular, however, the first chamber 32 is fully inflated.

In a second activated state of the side airbag module 24, in the first chamber 32 and in the second chamber 34 a second pressure p2 prevails, wherein the second pressure p2 is lower than the first pressure p1. Both chambers 32, 34 are now inflated.

The second activated state follows the first activated state during inflation of the side airbag 26.

In the driving situation illustrated in FIG. 1, the first chamber 32 constitutes a pusher that moves the vehicle occupant 16 away from the side structure of the vehicle 10 in case of need, when the side airbag module 24 is released. This is achieved by selecting an appropriately high first pressure p1.

The second pressure p2 is selected, on the other hand, so that the side airbag 26 has a supporting effect on a vehicle occupant.

Figure 2:
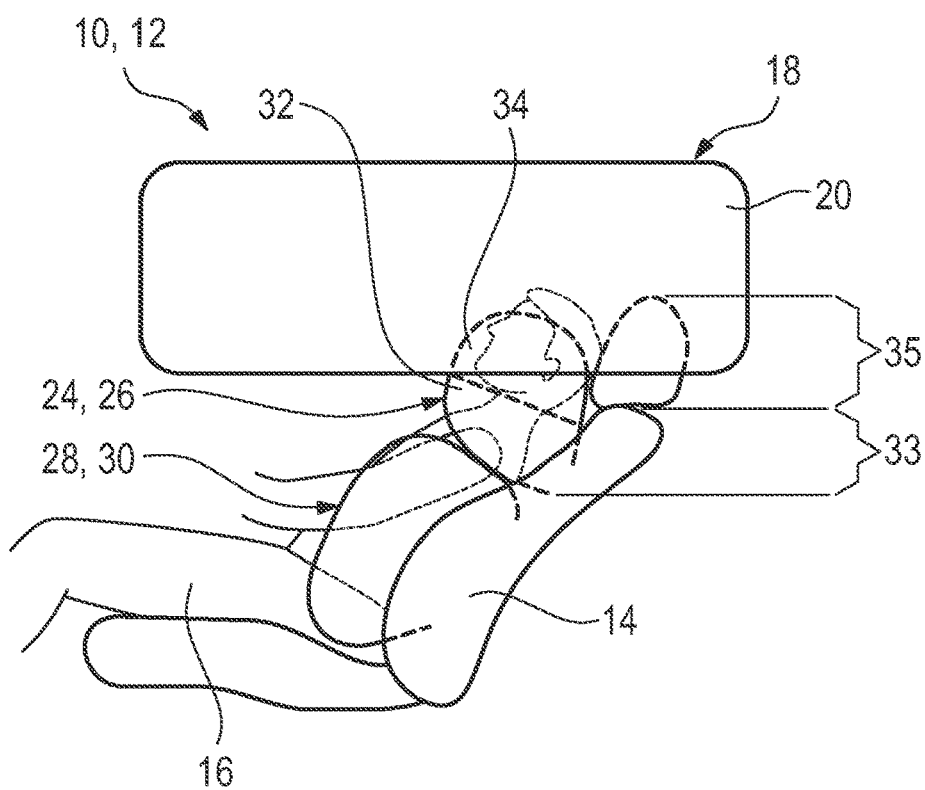

FIG. 2 illustrates the portion from FIG. 1, wherein the vehicle seat 14 is in a comfort position. In the comfort position the vehicle occupant 16 can further recline.

In contrast to the driving situation illustrated in FIG. 1, there is less overlapping of the side airbag 26 and the head airbag 20.

The second chamber 34 can serve, in this driving situation, as body protection, particularly as head protection, by appropriately selecting the second pressure p2.

Figure 3:
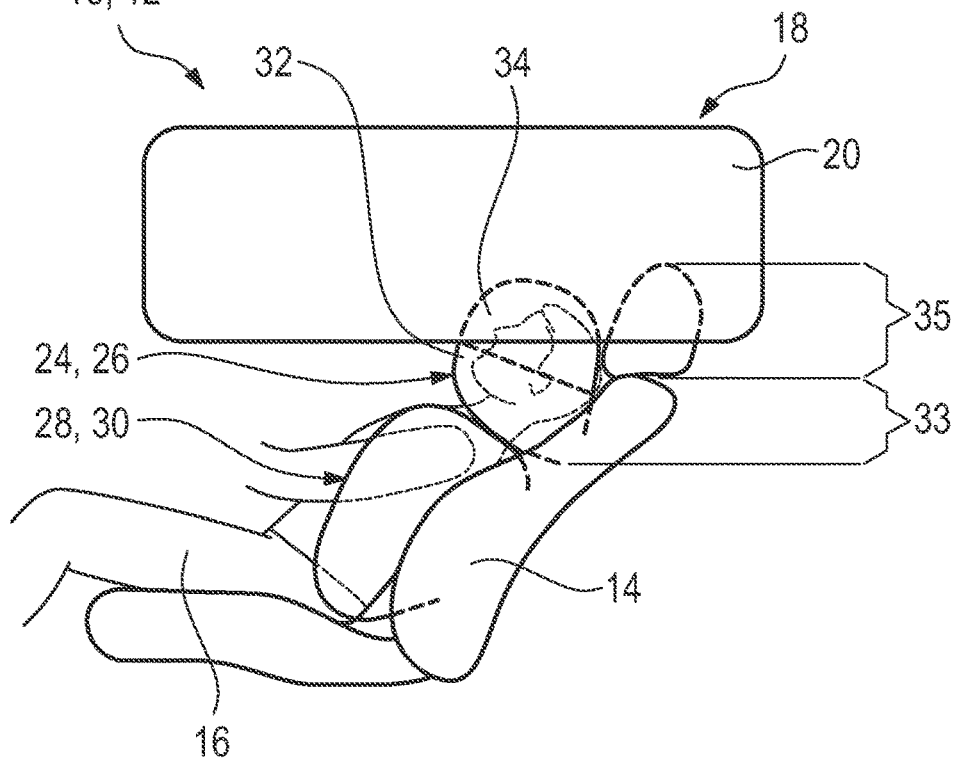

FIG. 3 shows the portion of the vehicle 10 illustrated in FIG. 2, wherein the vehicle seat 14 is in the same position as in the driving situation illustrated in FIG. 2. However, in FIG. 3 a vehicle occupant 16 is illustrated who has a smaller body size than the vehicle occupant 16 illustrated in FIG. 2.

In the driving situation illustrated in FIG. 3, the side airbag 26 may entirely serve as body protection, in particular as head protection.

Figure 4:
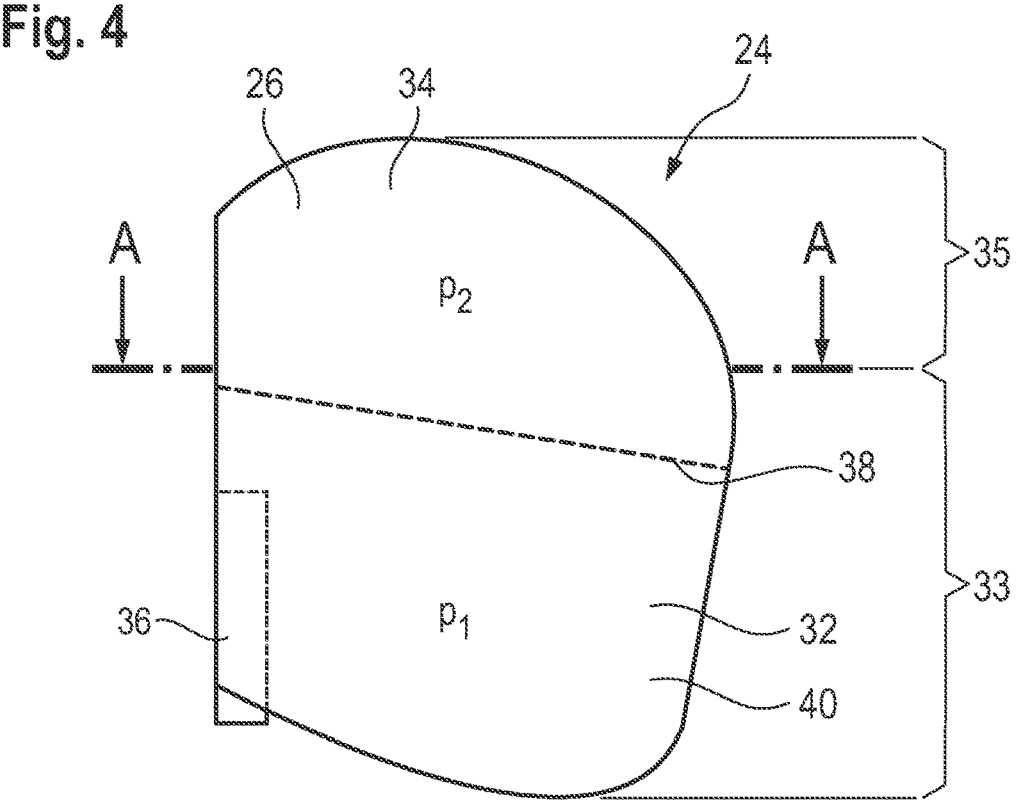

FIG. 4 shows the side airbag module 24 from FIGS. 1 to 3 in a detailed view.

The side airbag module 24 includes a gas generator 36 which is fluidically connected to the first chamber 32 of the side airbag 26. Thus, upon activation of the side airbag module 24, the gas generated by the gas generator 36 initially flows into the first chamber 32, thereby in the first activated state a higher pressure being present in the first chamber 32 than in the second chamber 34.

The first chamber 32 and the second chamber 34 are separated from each other by a partition wall 38 disposed inside the side airbag 26.

Apart from the partition wall 38, the side airbag 26 includes two outer walls 40, 41 which delimit the first chamber 32 and the second chamber 34, wherein only one of the two outer walls 40, 41 is visible in FIG. 4.

For fluidically connecting the first chamber 32 and the second chamber 34 to each other, an overflow opening 42 shown in FIG. 5 and constituting the fluid communication is provided in the partition wall 38.

Via the overflow opening 42, gas can flow into the second chamber 34 so that, in the second activated state, in both chambers 32, 34 the second pressure p2 adjusts.

The overflow opening 42 is a cutout in the partition wall 38, for example.

According to an alternative embodiment, the first chamber 32 and the second chamber 34 may be separated from each other by a seam connecting the outer walls 40, 41 in the side airbag 26. The partition wall 38 can thus be omitted.

In the case of a seam, an interruption constituting the fluid communication may be provided in the seam.

Providing a partition wall 38 offers the advantage over a seam that the side airbag 26 in the inflated state can be strongly inflated even in the area of the partition wall 38 so as to ensure body protection.

In order to be able to build up a sufficiently high pressure both in the first chamber 32 and in the second chamber 34, the side airbag 26, in particular the outer walls 40, 41, is designed to be tight.

FIG. 5 illustrates a section across the side airbag 26 along the line A-A in FIG. 4.

In the sectional view, the two outer walls 40, 41 as well as the overflow opening 42 can be seen.

In cross-section, the side airbag 26 in the inflated state, as illustrated in FIG. 5, has a wing-shaped or leaf-shaped profile.

The invention claimed is:

1. A side airbag module configured to be integrated in a seat of a vehicle, comprising:
   a side airbag including a first chamber and a second chamber provided above the first chamber, the chambers being fluidically connected to each other via a fluid communication,
   wherein the side airbag has a first activated state configured to protect an occupant of the vehicle seat in an upright condition of the vehicle seat, and a second activated state configured to protect the occupant of the vehicle seat in a reclined condition of the vehicle seat,
   wherein, in the first activated state, the side airbag module is configured to pressurize the first chamber to a first pressure, and
   wherein, in the second activated state, the side airbag module is configured to pressurize the first and second chambers to a second pressure that is less than the first pressure.

2. The side airbag module according to claim 1, wherein the first pressure is selected such that the first chamber is configured to push an occupant away from a vehicle side structure and/or to maintain the occupant at a distance from the vehicle side structure.

3. The side airbag module according to claim 1, wherein the first chamber and the second chamber are separated from each other by a partition wall disposed inside the side airbag, wherein an overflow opening constituting the fluid communication is provided in the partition wall.

4. The side airbag module according to claim 1, wherein the side airbag includes two outer walls delimiting the first and second chambers, wherein the first chamber and the second chamber are separated from each other by a seam connecting the outer walls, wherein an interruption constituting the fluid communication is provided in the seam.

5. The side airbag module according to claim 1, wherein the side airbag module includes a gas generator which is fluidically connected to the first chamber.

6. A vehicle seat comprising a side airbag module according to claim 1, wherein the side airbag module is arranged in the vehicle seat so that, in the first activated state, the first chamber is arranged in the shoulder area of the vehicle seat and the second chamber is arranged in the head area of the vehicle seat.

7. The vehicle seat according to claim 6, wherein the second chamber extends, in the first activated state, over the entire height of the head area.

8. The vehicle seat according to claim 6, further comprising a thorax airbag module arranged beneath the side airbag module in the vehicle seat.

9. A vehicle comprising a side airbag module according to claim 1 and a roof rail-integrated head airbag module including a head airbag, wherein, in a side view, in the first and/or in the second activated state, the side airbag is adjacent to and/or overlaps the head airbag.

10. The side airbag module according to claim 1, wherein the second pressure is selected such that the first chamber and/or the second chamber damps movement of a vehicle occupant toward a vehicle side structure.

11. The side airbag module according to claim 1, wherein the second pressure is selected such that the first chamber and/or the second chamber is configured to provide head protection for the vehicle occupant.

12. The side airbag module according to claim 1, wherein the airbag module is configured to be mounted in a seatback of the vehicle seat so that, in the first and second activated states, the first chamber is positioned adjacent an upper end portion of the seatback and the second chamber is positioned above the first chamber and at least partially above the backrest.

13. The side airbag module according to claim 1, wherein the airbag module is configured so that, in the first activated state with the vehicle seat in the upright condition, the first chamber is positioned adjacent a shoulder area of an occupant of the vehicle seat and the second chamber is positioned adjacent a head area of the occupant of the vehicle seat, and wherein the airbag module is configured so that, in the second activated state with the vehicle seat in the reclined condition, the first and second chambers are positioned adjacent the head area of the occupant.

14. The side airbag module according to claim 13, wherein the first pressure is selected so that the first chamber is configured to engage and move the occupant away from a side structure of the vehicle, and wherein the second pressure is selected so that the first and second chambers are configured to damp movement occupant toward the vehicle side structure.

15. The side airbag module according to claim 1, wherein the airbag module is configured to be mounted in a seatback of the vehicle seat so that, in the first and second activated states, the second chamber is positioned adjacent a head portion of the seatback and the first chamber extends downward from the second chamber, is positioned adjacent a shoulder portion of the seatback, and has a lower end that terminates at the lower extent of the shoulder portion of the seatback.

16. The side airbag module according to claim 15, wherein the lower end of the first chamber terminates above a thorax airbag of a thorax module mounted in the seatback.

17. The side airbag module according to claim 1, wherein the first chamber is positioned adjacent a shoulder portion of the seat and the second chamber is positioned adjacent a head area of the seat.

18. The side airbag module according to claim 1, wherein the side airbag is configured to be positioned above a thorax airbag configured to be positioned adjacent a thorax area of the occupant.

19. A restraint device comprising the side airbag module according to claim 1 and a thorax airbag module comprising a thorax airbag configured to be deployed below the side airbag.

20. A restraint device comprising the side airbag module according to claim 1 and a roof rail-integrated head airbag module comprising a head airbag, wherein the side airbag is configured so that the second chamber overlies the head airbag.

* * * * *